United States Patent [19]
Deerfield et al.

[11] 3,932,841
[45] Jan. 13, 1976

[54] BUS CONTROLLER FOR DIGITAL COMPUTER SYSTEM

[75] Inventors: Alan J. Deerfield, Newtonville; Stanley M. Nissen, Reading, both of Mass.

[73] Assignee: Raytheon Company, Lexington, Mass.

[22] Filed: Oct. 26, 1973

[21] Appl. No.: 409,846

[52] U.S. Cl.. 340/172.5; 179/15 AL; 340/146.1 BA
[51] Int. Cl.² .................................. G06F 13/00
[58] Field of Search .............. 340/172.5, 146.1 BA, 146.1 AG; 179/15 AL, 18 J

[56] References Cited
UNITED STATES PATENTS

| | | | |
|---|---|---|---|
| 3,742,148 | 6/1973 | Ledeen et al. | 179/15 AL |
| 3,752,932 | 8/1973 | Frisone | 179/15 AL |
| 3,755,786 | 8/1973 | Dixon et al. | 179/15 AL |
| 3,755,789 | 8/1973 | Collins | 179/15 AL |
| 3,757,050 | 9/1973 | Mizote | 179/15 AL |

Primary Examiner—Harvey E. Springborn
Assistant Examiner—Michael C. Sachs
Attorney, Agent, or Firm—Philip J. McFarland; Joseph D. Pannone

[57] ABSTRACT

An arrangement is shown for controlling transmission of blocks of information to and from a plurality of major components of a digital computer system interconnected by common buses. The disclosed arrangement operates so that any component of the system may normally seize, on a nonpriority basis, one of the buses at the beginning of any time slot defined by two successive clock pulses generated by a single source and applied to all components simultaneously; however, if a special instruction is encountered during execution of a program, any component may retain a bus for more than one time slot. The disclosed arrangement also permits error checking of transmitted information from a given major component without interfering with transmission from any other major component and automatically causes retransmission of any block of information found to be improperly transmitted originally. Still further, the disclosed arrangement permits buses to be dedicated during execution of a program or, if desired, any complete major component to be replaced without affecting any other major component.

5 Claims, 7 Drawing Figures

BUS CONTROLLER FOR DIGITAL COMPUTER SYSTEM

BACKGROUND OF THE INVENTION

This invention pertains generally to data processing systems and specifically to digital computer systems adapted to be modified to be used in many different applications.

It has been a prime objective of designers of digital computer systems to arrange the major components of such systems in a manner that the particular types of major components actually incorporated in a given system may be changed as desired for different applications. To permit such desired flexibility, it is well known to interconnect selected major components of a digital computer to terminals on a common bus and to provide bus control signals to direct the flow of data between selected ones of such components in a manner required for execution of a given program. With major components so interconnected, changes in the character and number of major components may easily be made as desired.

Although the principle of connecting major components of a digital computer system to a common bus is extremely simple, implementation of such a concept, without degradation of speed or accuracy of the system, is very difficult. First of all, operational characteristics of different types of major components, e.g. memory, arithmetic unit and peripheral equipment, of any digital computer system differ radically. It follows then, even in the simplest case, that the bus control signals generated during execution of a program must be adapted to the diverse operating characteristics of such different major components as are incorporated in any given digital computer system. Further, it is evident that, during execution of any program, the amount and character of information transferred between different major components by way of a common bus varies as any particular program is being executed. Obviously, therefore, the bus control signals generated during execution must be such that the order and manner of transmission of information may be varied to attain the most efficient execution of the program. The more sophisticated the computer system, the more important it is that the order of transmission of information between major components be properly controlled. Still further, it is mandatory in any digital computer system that the process of transferring each "unitary block" of information, say each digital word, from one major component to another includes verification procedures. That is, whenever a unitary block of information is to be transferred from one major component, say a memory, to another major unit, say an arithmetic unit, it is necessary to verify the fact that the desired transfer has been properly effected. Such verification may be accomplished by causing an "acknowledgment" signal to be returned over the common bus from the receiving component to the major component transmitting a unitary block of data. In response to the particular acknowledgment signal so returned to the transmitting major component, operation of such component (or the complete system) may then be continued or modified. Still further, if a digital computer system of any type is to be operated under adverse environmental conditions, it is necessary that means be provided to reduce the probability of system failure due to failure of the common bus.

In addition to the foregoing general requirements for any digital computer system incorporating different major components on a common bus, other requirements arise when operational speed is high or the major components are separated by any appreciable distance. In either such case, transmission delays suffered by synchronizing clock pulses between major components may become an appreciable portion of the time between successive ones of such clock pulses. To avoid difficulty, therefore, it is necessary that the common bus control signals be unaffected by transmission delays. Still further, when complex operations, as a "matrix multiply" operation, are to be executed it is highly desirable that only the major components used to execute such an operation be interconnected over a bus to interchange blocks of information. That is, there are occasions when a bus should be "dedicated"; it is highly desirable, therefore, that any bus control arrangement be adapted to permit many blocks of information to be transferred between designated major components to the exclusion of other major components in a digital computer system.

Many different approaches have been taken to solve the practical problems connected with common bus arrangements for digital computer systems. For example, it is known to provide a bus control arrangement based on a so-called "handshaking" principle. In arrangements of this type if information is to be transmitted from one major component to another, the receiving component is addressed so that an acknowledgment signal, i.e. a "busy" or "not busy" signal, may be generated and returned. Whether or not information may be transferred, time it taken to establish the status of the receiving major component, thus reducing the length of time for the desired transfer for information. To put it another way, the speed of operation of the system is reduced. To eliminate the delays inherent in "handshaking" it is known to provide bus control arrangements based on a so-called "time-slot" principle. In some known arrangements of such sort, each major component is permitted to transmit during a period between common synchronizing pulses applied to all, i.e. during a time slot. The simplest way to determine which major component may be transmitting is to assign, or dedicate, particular time slots to each different component. It follows, then, that in any given time slot, one (and only one) major component is allowed to transmit information. Such an approach results in faster operation than is possible with handshaking but is not ideal. Obviously, there will be many occasions in the execution of a program of almost any complexity when bus use requirements differ between the major components. It follows, then, that there are time slots during which the bus may not be used even though a major component is conditioned to transfer information. To increase efficiency in a "time-slot" bus control arrangement, it is known to provide a bus control arrangement based on a "nondedicated time-slot" principle. In such known arrangements the requisite bus control circuitry is ordinarily disposed in a so-called central controller and is arranged: (a) to poll the major components in a digital computer system to determine which ones of such components are conditioned to send or receive; and, then, (b) to provide an enabling signal to the major component next permitted to transmit. Known circuitry to accomplish such operations is, however, relatively complex and subject to failure. Further, with a central bus control arrangement, the physical location of the various components may limit operation. Because of transmission time delays suffered by any signal passing from one point to another, the distance of the major components in a digital computer system operating at high speed and using a central bus control arrangement may result in excessive delays affecting synchronization of the various major components.

SUMMARY OF THE INVENTION

Therefore, it is an object of this invention to provide an improved common bus control arrangement for a digital computer system.

Another object of this invention is to provide an improved common bus control arrangement whereby the operational speed of a digital computer system may be increased to an optimum.

Another object of this invention is to provide an improved distributed bus control arrangement whereby information may be transferred between major components of a digital computer system over any one of a plurality of common buses.

Still another object of this invention is to provide an improved bus control arrangement whereby a common bus interconnecting major components of a digital computer system may be dedicated, as desired during execution of a program, to permit communication between selected ones of such major components.

Still another object of this invention is to provide an improved distributed bus control arrangement whereby time delays inherent in transmitting synchronizing pulses between major components of a digital computer system may vary within wide limits.

These and other objects of this invention are attained by providing, for each major component of a digital computer system in which a common bus arrangement interconnects a plurality of such components, at least duplicate common buses to which all of such major components are connected. Associated with each one of the major components is a bus control arrangement and a transmit controller periodically actuated by synchronizing clock pulses from a single source, to permit, in accordance with the program being executed (ordinarily on an equal priority basis), a particular one of the major conponents normally to transfer a block of information (meaning a digital word) to all other major components over the first available bus. Also associated with each one of the major components is a receiving controller, responsive to an address code included in each transmitted block of information, to permit only a single one of the receiving major components to process each block of information and to return an acknowledgment signal to the transmitting major component. Each receiving controller is adapted to store a plurality of blocks of information, the number of such blocks being related to the characteristics of the associated major component. The bus control arrangements and transmit controllers are responsive to the acknowledgment signal, if such signal indicates improper transmission of a block of information, to retransmit, i.e. "retry," such block and are also adapted, in accordance with a program being executed, to dedicate a common bus during the time required to transmit a plurality of consecutive blocks of information.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Before reference is made to the detailed discussion of the drawings, several points should be observed. First, the drawings have been simplified in the interest of clarity by representing multi-line buses as a single line. It is deemed obvious that the number of lines in a bus and associated circuitry may be changed as desired by a designer to adapt the disclosed arrangement to parallel digital words of any given length. Further, positive logic has been adopted for convenience of exposition. That is, a logic one has been chosen to represent positive conditions, e.g. a bus is available or a major component is in condition to transmit. Conversely, a logic zero has been chosen to represent negative conditions, e.g. a bus is unavailable or a major component is not in condition to transmit. Again, it is deemed obvious that a designer may choose to use negative or mixed logic in an operating system. Further, the term "major component" should be taken to mean conventional digital computer subassemblies, such as: Memories of any configuration ranging in speed of operation between wide limits; data processing elements adapted to perform any required operations on data; input/output devices; and, even complete auxiliary computers. Necessary portions of such subassemblies, as program counters and instruction registers and the like, have not been explicitly shown. Again, it is deemed obvious that one of skill in the art would incorporate such elements in any conveniently located major component.

It should also be borne in mind throughout the following that the illustrated bus control arrangement exemplifies the contemplated idea that information may ordinarily be transferred between major components of a digital computer system over one of a plurality of normally nondedicated buses, the operation of such buses and major components being controlled to allow any one given major component to transmit a signal digital word on a nonpriority basis between two successive synchronizing clock pulses applied to all major components. The illustrated bus control arrangement further exemplifies the idea that, if desired, any bus may be dedicated for any length of time desired to permit blocks of digital words to be transmitted. In this connection it should be noted that the length of time any bus is dedicated may be controlled by an instruction code and not by change in wiring of the bus control arrangement. Conversely, the illustrated bus control arrangement permits major components to be "switched" in or out of the digital computer system, thereby allowing defective components to be replaced. Finally, it should be noted that the illustrated bus control arrangement also exemplifies the idea that receiving circuitry may be provided at each major component so that no handshake is required and an error check, as parity, may be made after the transmitting major component has released the bus and a different major component may be transmitting information over the same bus.

Figure 1:
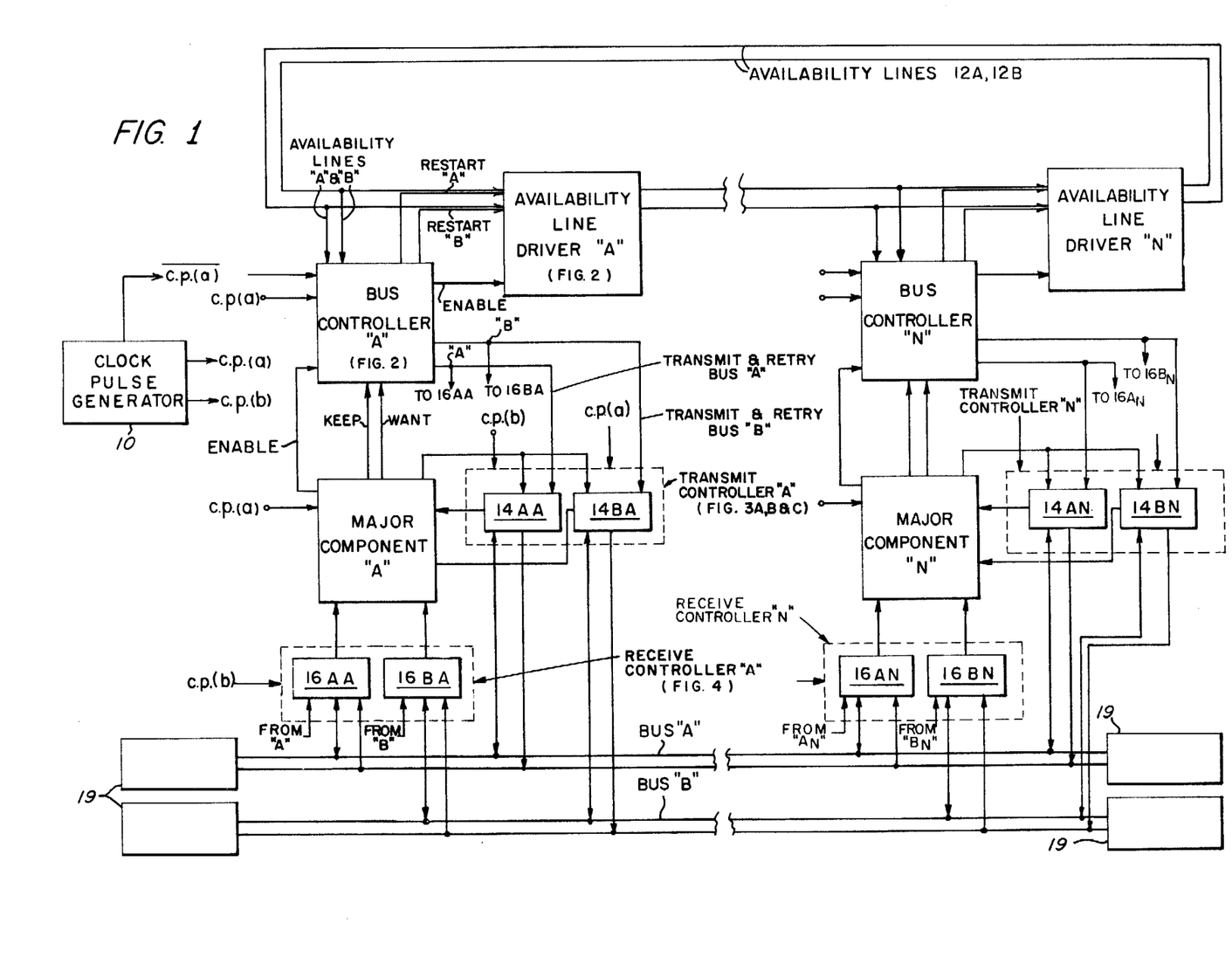
FIG. 1 is a block diagram of an exemplary digital computer system according to the concepts of this invention.

Referring now to FIG. 1, it may be seen that our inventive concept encompasses the idea of providing: (a) a first plurality of buses (here two, indicated as bus A and bus B terminated in appropriate loads 19 interconnecting each one of a second plurality of major components (here indicated as major component A . . . major component N) of a digital computer system; (b) a second plurality of bus controllers, here indicated as bus controller A . . . N (an exemplary one being shown in detail in FIG. 2) operative to control the voltage level on availability lines 12A, 12B, thereby finally, in a manner to be described, to permit information (normally in the form of a single digital word) to be transmitted from a particular one of the major components to all other major components; (c) a second plurality of transmit controllers, as transmit controllers, A . . . N (an exemplary one being illustrated in detail in FIGS. 3A, 3B and 3C), actually to control the transmission of information, whether directly from the associated major component or from an auxiliary store (if an error in transmission is detected); (d) a second plurality of receive controllers, as receive controllers A . . . N (an exemplary one being illustrated in FIG. 4) adapted: (i) to receive all information transmitted over either bus A or bus B; (ii) to respond only to information addressed to the corresponding major component in a manner that such information is accepted (if properly received) or is rejected (if improperly received); and (iii) to return an acknowledgment signal to the transmitting major component during a following time slot; and (e) a clock pulse generator 10 for synchronizing the operation of the various elements.

As will become clear for reasons set forth hereinafter, the bus controllers A . . . N are arranged to respond, at each clock pulse, to the state of availability lines 12A, 12B, the state of the associated line drivers (here indicated as availability line drivers A . . . N) and the state of the associated major components A . . . N (or the state of error checking circuitry to be described). Suffice it to say here the result is that, immediately after each clock pulse, "normal" operation of the next following (here in a counterclockwise direction) bus controller associated with a major component conditioned to transmit information causes either bus A or bus B to be seized and information from such component to be transmitted until the next following clock pulse occurs. It may be seen from the foregoing that normal operation of the contemplated bus control arrangement permits a single block of information, i.e. a digital word, to be transmitted in any time slot, meaning the interval between successive clock pulses from any given major component. Before a second block of information may be transmitted from that major component all other major components which are conditioned to transmit must transmit a single block of information. In some situations, as when a double precision word or the elements of a matrix are to be transmitted by a major component, normal operation may not be desirable. In such situations, then, the control signals to a given bus controller may be changed so that the bus controller, having once seized a bus, "dedicates" that bus as two or more blocks of information to be transmitted during successive time slots before any other bus controller may seize the bus. In the rare case when all buses (here bus A and bus B) are being used to transmit information, no bus controller (other than the two actuated ones) may then seize a bus.

Figure 2:
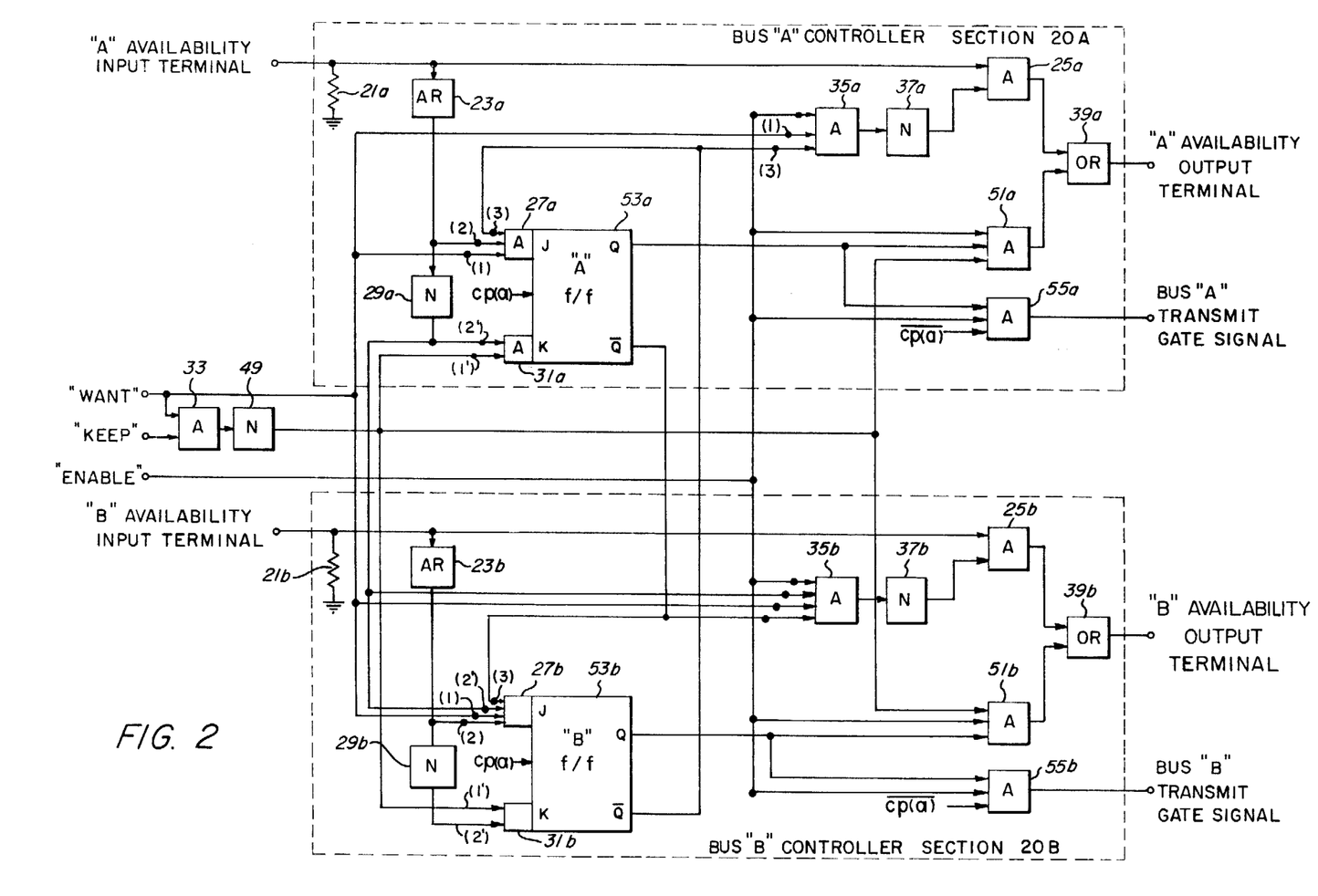
FIG. 2 is a block diagram of an exemplary bus control arrangement according to this invention.

Referring now to FIG. 2, it may be seen that each one of the bus controllers A through N here includes a bus A controller section 20A and a bus B controller section 20B having similar components. For this reason, only bus A controller section 20A will be completely described in detail. Thus, availability line 12A is connected through an A availability input terminal (not numbered) to a load resistor 21a, a buffer amplifier 23a and an AND gate 25a. The buffer amplifier 23a in turn is connected to an AND gate 27a and an inverter 29a. The latter in turn is connected to an AND gate 31a. If it be assumed that bus A is available for transmission by the major component associated with the bus controller being discussed, then it follows that no other one of the bus controllers has seized bus A and a logic one signal exists at the A availability terminal. A logic one is then impressed on AND gates 25a, 27a and a logic zero is impressed on AND gate 32a (by reason of the inversion of the logic one at the A availability terminal by an inverter 29a). If it be assumed that the associated major component is in condition for transmission, i.e. "wants" to transmit, a logic one signal exists at the want terminal (not numbered). Such logic one is passed to an AND gate 33, in addition to AND gates 27a, 35a. If, under conditions to be detailed hereinafter, all other inputs to AND gate 35a are logic ones, the output signal of that gate is changed by an inverter 37a to a logic zero applied to AND gate 25a. The signal out of the latter then is a logic zero, which is applied to an OR gate 39a.

The second input to the AND gate 33 is a logic one when, for reasons to be explained, it is permitted to transmit a single digital word, or a number of successive words from the associated major component. This signal is referred to as a "keep" signal. It follows that, with both a "want" and a "keep" signal existing, the associated major component is in condition to transmit either one or more digital words and that a logic one is applied to the inputs of an inverter 49. A logic zero, therefore, is passed to AND gates 31A, and to AND gates 51A, as long as the want and keep conditions exist.

It will be noted that AND gates 27A, 31A are internal gates of a J-K flipflop 53A. It will further be noted that under the assumed conditions, i.e. a logic one on the availability availabiliy input terminals, the want and keep terminals also having a logic one impressed thereon, a logic one appears on the J input of the J-K flipflop 53a and a logic zero appears on the K input of that flipflop. The J-K flipflop 53a is, therefore, in its preset condition, i.e. a logic one appears at the Q output and a logic zero appears at the Q output. The logic one is applied to AND gate 51a (without effect because a logic zero from inverter 49 is also applied). The second input to OR gate 39a is, therefore, a logic zero (because AND gate 25a also produces a logic zero) a logic zero is impressed on the next following bus controller. An AND gate 55a is, however, enabled during the interval, c.p.(a), between clock pulses c.p.(a).

Referring now also to FIG. 1, it may be seen that, because the operation of the just described bus A controller section 20A is effective to force a logic zero on the A availability output terminal (not numbered), a logic zero then is passed over availability line 12A to the A availability input terminal of the next following bus controller (here bus controller B, not shown in FIG. 1). The effect of a logic zero on the next following bus controller will now be explained by demonstrating the effect of such a logic zero on bus A controller section 20A. Thus, very simply, if a logic zero is impressed on the A availability input terminal, AND gate 25a is inhibited so a logic zero appears at its output. At the same time a logic zero appears at the J input of the J-K flipflop 53a because AND gate 27a is also inhibited by the logic zero at the A availability input terminal. Inverter 29a operates to convert the logic zero at the A availability input terminal to a logic one on AND gate 31a. The second input to the latter gate is derived from inverter 49. Therefore, that second input may be either a logic one (if a want and a keep signal exist simultaneously) or a logic zero (if both a want and a keep signal are not present). It follows, then, that either a logic one or a logic zero is impressed on the K input of the J-K flipflop 53a. Whatever the level of the signal on the K input of the J-K flipflop 53a, that element is forced to its clear condition. This in turn means that AND gates 51a and 55a are inhibited, thus preventing transmission of information and making the second input to OR gate 39a also a logic zero.

It will be remembered, however, that initially, i.e. when a logic one was impressed on the A availability input terminal of bus A controller 20A that the signal, along with a want signal on the J terminal of the J-K flipflop 53a, caused that element to produce a logic one at its Q output. The fact that a logic zero is impressed on the J input (by reason of a logic zero on the A availability input terminal) has no effect in changing the state of J-K flipflop 53a, nor does the next clock pulse, c.p.(a). Thus, the logic one is passed from the Q output of J-K flipflop 53a and remains on the AND gate 51a even though the logic one initially impressed on the A availability input terminal of bus A controller 20A changes from a logic one to a logic zero. At the same time AND gate 51a is inhibited by reason of a logic zero from inverter 49. Therefore, a logic zero remains on the A availability output terminal of bus A controller section 24A.

After one, or more, clock pulses have occured, depending upon the number of blocks of information to be transmitted from the major component associated with bus A controller section 20A, either (or both) the want and keep signals may be changed from a logic one to a logic zero. The output of the inverter 49 then changes to a logic one. This change in turn causes a logic one to be applied to the K input of the J-K flipflop 53a and to the AND gate 51a. The output of the latter then is a logic one which passes through the OR gate 39a to appear first at the A availability input terminal of the next following bus A controller section. If that section has a want signal impressed on it, then it operates as described to seize bus A; on the other hand, if no want signal is present, AND gate 25a of that section passes the logic one to the next section. Therefore, each one of the bus A controller sections B . . . N is successively actuated either to seize bus A or to allow the next following one to seize bus A. After a logic one is applied to the K input of the J-K flipflop 53a, the next following clock pulse, c.p.(a), resets that flipflop so that it is conditioned to operate again when the proper actuating signals are applied.

The interconnections between bus A controller section 20A and 20B will now be explained. Thus, the output of inverter 29a is connected to AND gates 27b and 35b. It may be seen that such connections: (a) permit a logic one to be applied to the J input of J-K flipflop 53b and a want signal to enable AND gate 35b only when bus A has been seized by one of the bus A controller sections 20A . . . 20N. This simply means that, if both bus A and bus B are available, bus A will be chosen to be used.

The interconnections from the Q outputs of the J-K flipflops 53a, 53b simply prevent both bus A controller section 20A and bus B controller section 20B from simultaneously seizing bus A and bus B. Thus, if bus A has been seized, J-K flipflop 53a will be in its preset condition as previously described. A logic zero will then exist at the Q output of J-K flipflop 53a. Such logic zero is then applied to AND gate 27b and AND gate 33b, inhibiting both regardless of any other signals applied to either. J-K flipflop 27b, as a result cannot be forced into its preset condition, with the result that AND gates 51b, 55b cannot be enabled. The connection of the Q output of J-K flipflop 53a to AND gate 35b simply stops propagation of a logic one on the B availability line 12b (FIG. 1), if a logic one is impressed on the B availability input terminal. If it is desired that synchronism between the two bus controller sections not be maintained, the connection from the Q output of J-K flipflop 53a to AND gate 35b need not be made. In such case, bus B controller section 20B will still be inhibited from seizing bus B when J-K flipflop 53a is conditioned to seize bus A, but a logic one of the B availability line 12b will be passed and a bus B controller section associated with a different major component may seize bus B. The connections from the Q output of J-K flipflop 53b similarly are effffective to inhibit operation of bus A controller section 20A when J-K flipflop 53b operates.

The control line designated as enable and connected to AND gates 35a, 35b, 51a, 51b, 55a, 55b simply may be considered to provide a kind of electrical interlock. As long as a logic one is applied to the enable line, the bus controller sections may operate as described. If a logic zero is applied to the enable line, then neither bus A controller section 20A nor bus B controller section 20B may seize a bus. That is, with a logic zero on the enable line, AND gate 25A is always enabled so that whenever a logic one is applied to either the A or the B availability input terminal, a logic one appears at the corresponding availability output terminal. Such a condition, it may be seen, is required when it is desired to remove a major component from the contemplated system without disturbing any other. Further, by impressing a logic one on the enable line in sequence when the contemplated digital computer system is first actuated (as by an instruction to initiate operation), any one of the bus controllers A . . . N may be selected to be the first one to seize a bus, thereby eliminating the possibility of instability between the various bus controller sections A . . . N.

Figure 2A:
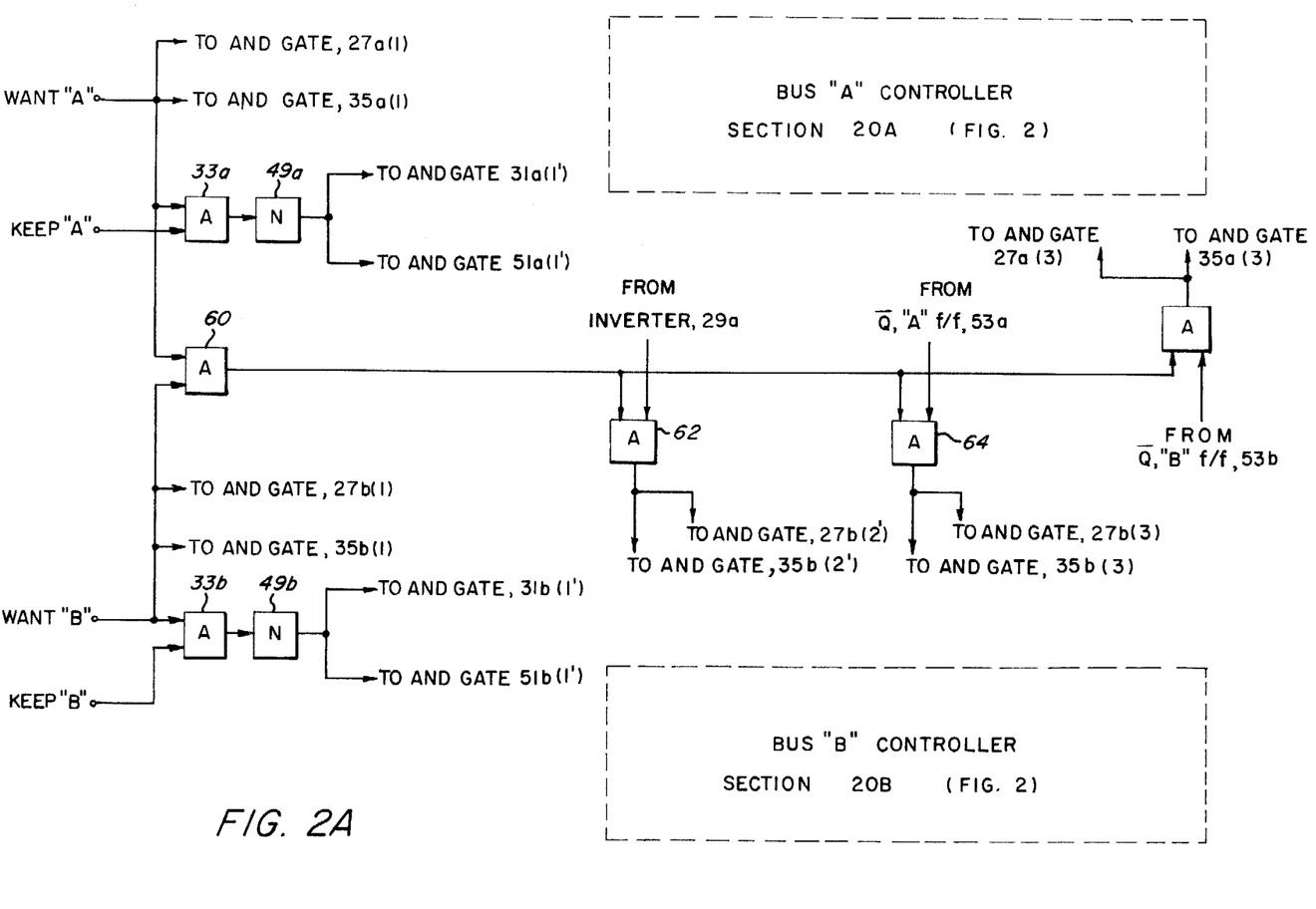
FIG. 2A is a modification of the block diagram shown in FIG. 2.

Referring now to FIG. 2A, it may be seen that the bus controller shown in FIG. 2 easily may be modified to allow information from selected ones of the major components to be transmitted on either bus A or bus B and to allow information from other ones of the major components to be transmitted on only a single one of such buses. That is, if the lines interconnecting bus A controller section 20A and bus B controller section 20B are removed and the circuitry now to be described inserted, transmission on either bus A or bus B may be permitted or inhibited. Thus, in FIG. 2A separate want and keep terminals are provided for each controller section. Each separate want and keep terminal is connected as shown (to replace the corresponding connections shown in FIG. 2) to elements within bus A controller section 20A and bus B controller section 20B. In this connection, AND gate 33 and inverter 49 (FIG. 2) are replaced by AND gates 33a, 33b and inverters 49a, 49b. It will be recognized that, absent any other changes, the just mentioned changes would separate the two bus controller sections into two independently operating sections. To allow, as described in connection with FIG. 2, selection between bus A and bus B, (or conversely to inhibit operation of either) the want A and want B terminals are connected to an AND gate 60, which in turn is connected to AND gates 62, 64, 66. It may be seen that, if a logic one is impressed on both the want A and the want B terminals, AND gates 62, 64, 66 are enabled so that either the bus A controller section 20A (FIG. 2) or the bus B controller section 20B may operate in the manner described in connection with FIG. 2. If, on the other hand, a logic zero is impressed on the want A terminal and a logic one is impressed on the want B terminal, the output of AND gate 60 is a logic zero, thereby inhibiting operation of AND gates 62, 64, 66. When the latter gates are inhibited, the bus A and bus B controller sections are, as noted above, effectively separated from each other. It follows then, that the want signals applied to such separated sections determine whether or not either (or both or neither) may seize its associated bus. For example, if a logic zero is applied to the want A terminals of the bus controller sections, except those associated with major components A and N, then information may be transmitted on bus A only between major components A and N. That is, bus A is dedicated to major components A and N (although bus B may also be used for such communication). Further, if a logic zero is applied to both the want A and the want B terminals of any given bus controller the associated major component is, in effect, disconnected from the digital computer system.

Having described the construction of an exemplary bus control arrangement, it will now become evident that, as shown in FIG. 1, the resulting assembly is a closed loop constituting a distributed nonpriority controller operating on a time slot principle. Each bus control arrangement is partially responsive to the condition of the preceding bus control arrangement in the closed loop and to control signals from an associated major component. The condition of the preceding bus control arrangement indicates whether or not a bus is available. The control signals from the associated major component indicate (by the want signal, here being a logic one) that the major component is conditioned to transmit a block of information and (by the keep signal, here being a logic one) that the block of information is to be transmitted during the next available time slot. It will be obvious to one of skill in the art that the want and keep signals may normally be generated by providing stages in an output register for each major component, and by loading, in any convenient manner, logic ones into such stages whenever a block of information is to be transmitted and is being transmitted.

Figure 3A:
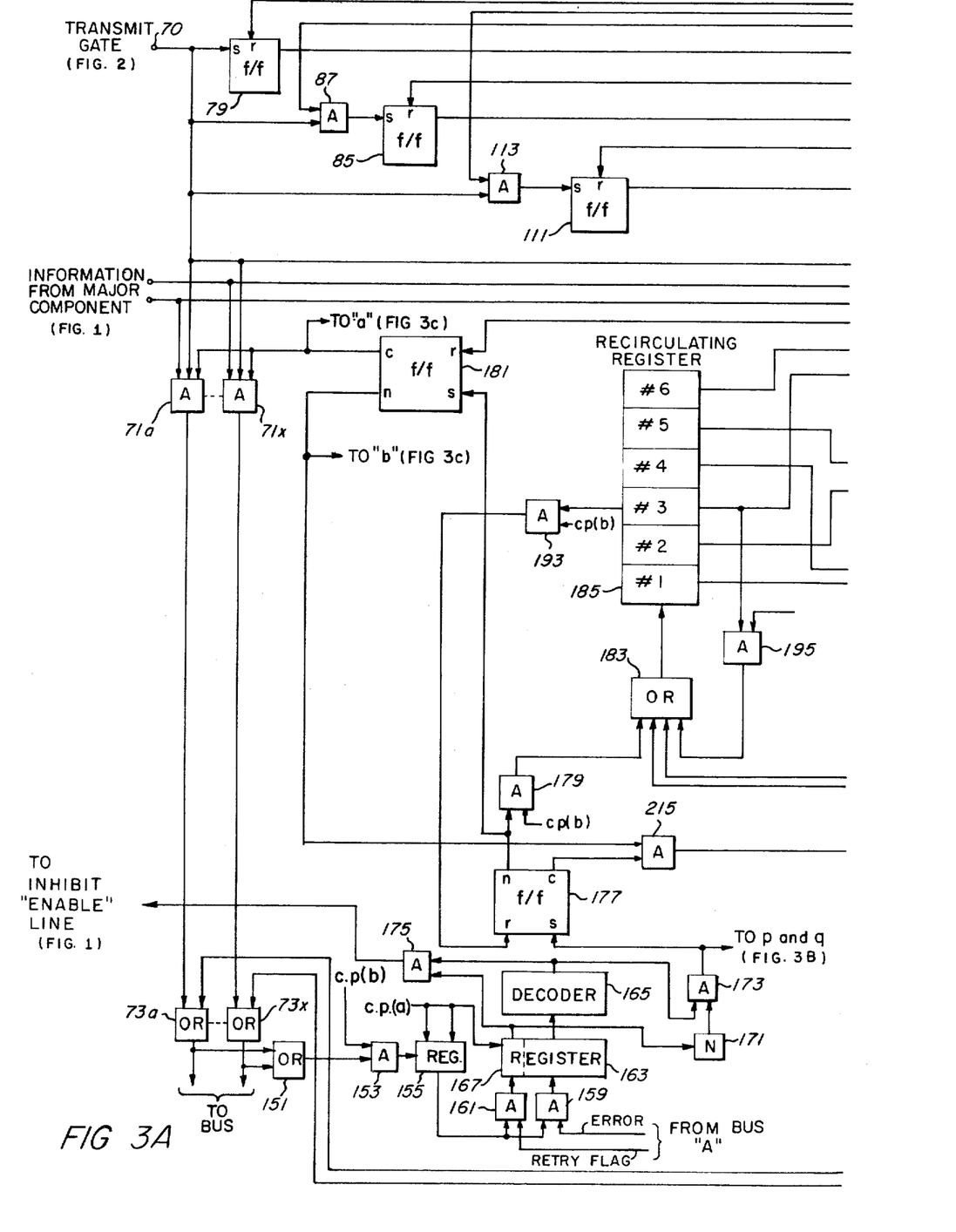
FIGS. 3A, 3B, 3C taken together make up a block diagram of an exemplary transmit controller for transmitting a block, or blocks, of information over a common bus.
Figure 3B:
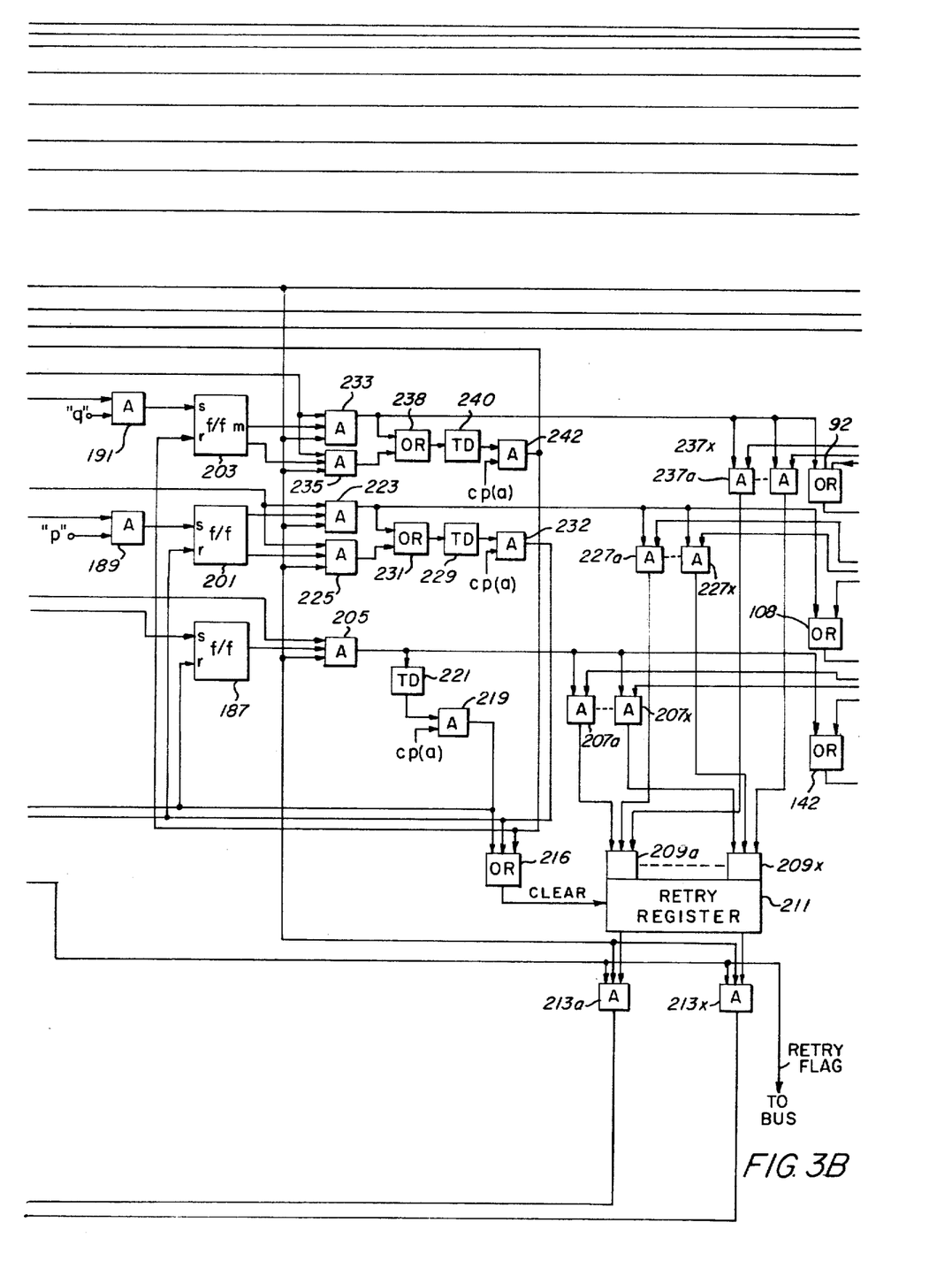
Figure 3C:
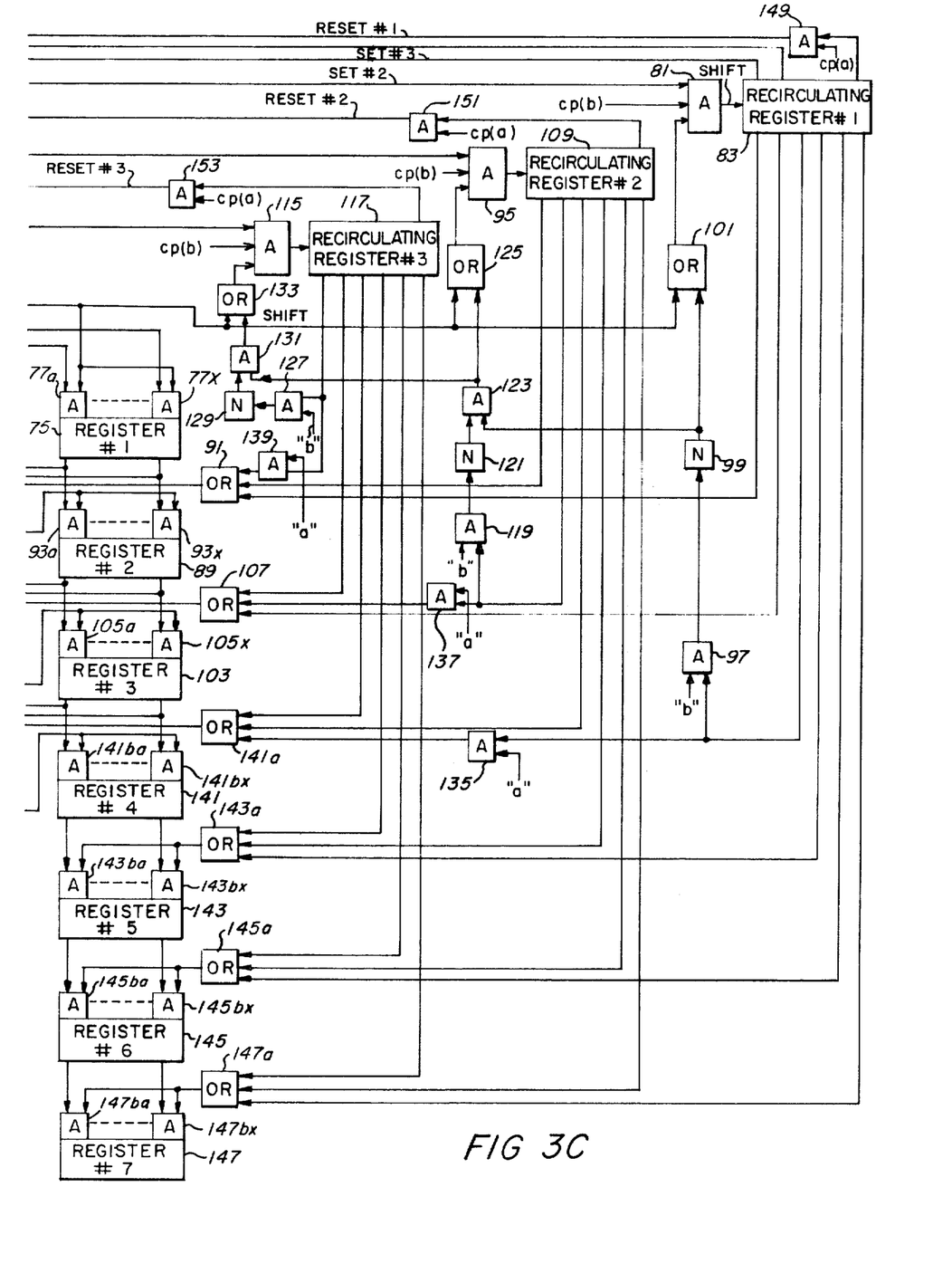

Referring now to FIGS. 3A, 3B and 3C together, it is noted that the details of only the portion of a transmit controller for bus A are shown because the details of the remaining portion of such controller for bus B are similar. Thus, each time a bus A transmit gate (from AND gate 55a, FIG. 2) is applied to an input terminal 70, each one of a plurality of AND gates 71a through 71x is partially enabled. If, for reasons to be described hereinafter, such gates are not then inhibited by reason of an error signal, a block of information (meaning a digital word containing operation and operand address codes and the like) to be transmitted from major component A is passed through a like plurality of OR gates 73a ... 73x to bus A, thereby being transmitted during a given time slot to all other major components. At the same time, the block of information is also impressed on a register 75 (designated register 1, FIG. 3C) through AND gates 77a ... 77x. The bus A transmit gate also causes a flipflop 79 to be set and an AND gate (FIG. 3B) to be partially enabled. Thus, each time a transmit gate occurs, AND gate 81 is fully enabled and successively occurring clock pulses, c.p.(b), from the clock pulse generator 10 (FIG. 1) cause a logic one to be shifted through a recirculating register 83 (designated recirculating register 1 in FIG. 3C). A logic one in the first stage of such register then causes: (a) a flipflop 85 (FIG. 3A) to be set, through an AND gate 87, by the next clock pulse, c.p.(b), to occur; and (b) the block of information in register 75 to be transferred to a register 89 (designated register 2 in FIG. 3C) by operation of an OR gate 91, an OR gate 92 (FIG. 3B) and AND gates 93a ... 93x. At the end of the first A transmit gate flipflops 79, 85 remain set to partially enable, respectively, AND gate 81 and an AND gate 95. Full enabling of AND gate 81 is then accomplished by conversion of the logic zero in stage three of recirculating register 83 to a logic one and applying such logic one, through OR gate 101, to AND gate 81. Thus such logic zero is applied to an AND gate 97, FIG. 3C, (to produce a logic zero regardless of the second input to such gate) and is changed to a logic one in an inverter 99. Full enabling of AND gate 95 is accomplished in a generally similar manner to be described. The next following clock pulse, c.p.(b), causes: (a) the logic one in stage one of the recirculating register 83 to be shifted to stage two of that register, thereby causing the contents of register 89 to be shifted to register 103 (designated register 3 in FIG. 3C) by operation of AND gates 105a ... 105x through OR gate 107 and OR gate 108 (FIG. 3B); (b) a logic one to be impressed on stage one of recirculating register 109. When the next transmit gate occurs: (a) a flipflop 111 (FIG. 3A) is set through an AND gate 113, thereby partially enabling an AND gate 115, which controls a recirculating register 117 (designated recirculating register 3 in FIG. 3C); (b) the contents of register 75 are shifted to register 89; (it is noted here that if bus A transmit gates had been impressed on terminal 70 during two successive clock periods the contents of register 75 shifted to register 89 would be the second block of information transmitted; otherwise only logic zeros would be transferred to register 89); and (c) the contents of register 89 are shifted to register 103. As the foregoing occurs, AND gates 95, 115 are fully enabled: The former through operation of AND gate 119, inverter 121, AND gate 123 and OR gate 125; and the latter through operation of AND gate 127, inverter 129, AND gate 131 and OR gate 133.

After the first transmitted block of information is in register 103, but before such information is shifted out of that register, an acknowledgment signal indicating either "proper receipt of the first transmitted block of information by the addressed major component for such block" or "failure of such receipt" is received. The manner in which the acknowledgment signal is generated will be discussed hereinafter. Suffice it to say here that such signal in its simplest form is a logic zero if receipt has been properly effected and a logic one if receipt has not been properly effected.

If receipt is properly effected: (a) a logic zero is applied to AND gates 97, 119 and 127; (b) a logic one is applied to AND gates 135, 137, 139; and (c) a logic one is applied to AND gates 71a . . . 71x and to AND gates 77a . . . 77x. It may be seen that with the just mentioned gates all enabled, operation of the transmit controller continues as described. That is, each successive clock pulse, c.p.(b), simply shifts the blocks of information in registers 103, 89, 75 sequentially through registers 141 . . . 147 by reason of operation of the associated OR gates 141a, 142 (FIG. 3B), 143a, 145a, 147a and AND gates 141 ba . . . 141 bx, 143 ba . . . 143 bx, 145 ba . . . 145 bx, 147 ba . . 147 bx. After each shift a new block of information may be inserted in register 75 to correspond with a transmitted block of information if a transmit gate is applied to terminal 70. As the logic one in each one of the recirculating registers 83, 109, 117 reaches the sixth stage, AND gates 149, 151, 153 are successively enabled. The next following clock pulse, c.p.(a), applied to each one of such gates then successively resets flipflops 79, 85, 111, thereby placing the entire transmit controller back in its original condition. It is noted here that, if it be desired to transfer a plurality of blocks of information, as, for example, a number of digital words making up a matrix, it would be desirable to inhibit reset of the flipflops 79, 85, 111. In such case it is obvious that the clock pulses, c.p.(a), passing over the lines to the reset terminals of flipflops 79, 85, 111 should be inhibited until all of the individual blocks of information have been transmitted. Such inhibition may be accomplished in any convenient manner. For example, because a want signal is maintained while any plurality of blocks of information are to be transmitted, a logic one (representative of want out of the major component) may be passed through an inverter (not shown) to AND gates 149, 151, 153. Consequently, the logic ones in the recirculating registers 83, 109, 117 would be recirculated continuously until all of the blocks of information are transmitted.

When the acknowledgment signal is a logic one (indicating that the block of information corresponding to the block in register 103 was not properly received by the addressed major component), a logic one is applied to AND gates 97, 119, 127 and a logic zero is applied to AND gates 135, 137, 139, AND gates 71a . . . 71x and to AND gates 77a . . . 77x. The effect of such signals is to prevent transmission of a new block of information from the major component A until the block of information in register 103 has been transmitted. To put it another way, major component A is inhibited from transmitting new blocks of information until an improperly received block of information is "retried". Thus, when an "error" occurs in the transmission of the block of information in register 103, all of the inputs to OR gates 141a, 107, 91 are forced to become logic zeroes and AND gates 81, 95, 115 are (absent a transmit gate) inhibited. At the same time, the mode of control for the shifting of blocks of information through the registers 75, 89, 103, 141, 143, 145, 147 is changed in a manner to be described until the blocks of information in registers 103, 89, 75 have been retransmitted, i.e. retried.

Referring now to FIGS. 3A and 3B in particular, it may be seen that the contemplated retry circuitry is actuable during the second following time slot after a block of information is transmitted. Thus, whenever any block of information is transmitted, a logic one is passed through an OR gate 151 to enable an AND gate 153 to allow a logic one to be loaded into the first stage of a shift register 155. On the other hand, if no block of information is transmitted, a logic zero is, in effect, loaded into such first stage. The second stage of the shift register 155 is connected to enable a pair of AND gates 159, 161. It follows, therefore, that AND gates 159, 161 are enabled during the time slot after the time slot following transmission of a block of information, whether such transmission is for the first time or retried. When AND gates 159, 161 are enabled their second inputs are, respectively, an error (or no error) signal and a retry (or no retry) signal from bus A. It will become clear hereinafter that, because of the construction of the receive controller (FIG. 4) and the delay in enabling the AND gates 159, 161 after transmission of a block of information, the outputs of the AND gates 159, 161 are indicative of proper, or improper, receipt of a block of information by the particular major component addressed in the originally transmitted or retried block of information. Any signal out of AND gate 159 is impressed on a register 163 so that it may be decoded in a decoder 165. Therefore, if an error is sensed, whether in an originally transmitted or a retried block of information, decoder 165 here produces a logic one; otherwise such decoder produces a logic zero. Similarly, the output of AND gate 161 is impressed on a register 167; in this case a logic zero is indicative of an originally transmitted block of information and a logic one is indicative of a retried block.

Register 167 is connected, through an inverter 171, to one input of an AND gate 173. The second input to the last mentioned gate is taken from the decoder 165. The output, then, of AND gate 173 is a logic one only if an error signal is received in connection with an originally transmitted block of information. The register 167 and the output of the decoder 165 are connected directly to an AND gate 175. The output of that gate is a logic one only if an error signal is received in connection with a retried block of information. As shown, a logic one at the output of AND gate 175 causes the enable line from the major component (FIG. 1) to the bus controller (FIG. 2) to be inhibited because two unsuccessful attempts to transmit a particular block of information have been made.

A logic one from AND gate 173 causes, inter alia, a flipflop 177 (normally reset) to be set. The normal output of flipflop 177 is connected to an AND gate 179 and a flipflop 181 to cause that normally reset flipflop to be set. As long as the latter flipflop is set, i.e. during the retry cycle now being described, a logic one is impressed on the want terminal (FIG. 2). On the occurrence of the next following clock pulse, c.p.(b), a shift signal is passed through AND gate 179, via an OR gate 183, to a recirculating register 185. A logic one is then shifted into stage 1 of that register, thereby setting a flipflop 187 (FIG. 3B). Because flipflop 177 causes AND gate 179 to remain enabled for the next two clock pulses, c.p.(b), the logic one in stage 1 of the recirculating register 185 is shifted successively to stages 2 and 3, thereby successively enabling AND gates 189, 191 (FIG. 3B). When a logic one is shifted into stage 3 of recirculating register 185, AND gates 193, 195 are also enabled. With these latter two gates enabled the next following clock pulse, c.p.(a), causes flipflop 177 to be reset and the logic one in stage 3 of recirculating register 185 to be shifted to stage 4.

It will be noted that registers 163, 167 are cleared by each successive clock pulse, c.p.(a), and that, when a logic one is shifted into stage 4 of recirculating register 185, AND gates 159, 161 are inhibited by reason of the fact that a logic zero must then be in the second stage of register 155. This means, in turn, that once an error signal associated with an originally transmitted block of information is received, only that block and the blocks (if any) in the next two time slots may be retried. If no block of information was transmitted in either of the two following time slots, then a logic zero is produced by the decoder 165 in the two time slots following the first error signal. This means that neither AND gate 189 nor AND gate 191 ever may pass a logic one to the set terminal of flipflops, 201, 203. On the other hand, if a block of information was transmitted from the associated major component in either one of the two time slots immediately following the one containing an improperly received block of information, then decoder 165 may, or may not, produce an error signal to enable (on the inputs marked $p$ and $q$) AND gate 189 or AND gate 191. Therefore, flipflops 201, 203 may, or may not, be set as the logic one is shifted through the first three stages of the recirculating register 185, depending upon whether or not an error signal is received. In other words, flipflop 187 is always set because the originally transmitted block of information in register 103 (FIG. 3C) was not properly received; flipflop 201 is set if the block of information in register 89 was improperly received; and flipflop 75 is set if the block of information in register 75 was improperly received.

When the logic one is recirculating register 185 is shifted to stage 4, AND gate 205 (FIG. 3B) is partially enabled. That gate is fully enabled during the next following transmit gate, thereby enabling AND gates 207a . . 207x. The contents of register 103 (FIG. 3C) are, therefore, transferred through OR gates 209a . . . 209x to a retry register 211. The contents of register 103 are, at the same time, transferred to register 141 (FIG. 3C) by reason of a logic one from AND gate 205 passing through OR gate 142 to enable AND gates 141 ba . . . 141 bx. The contents of the retry register 211 are, during this transmit gate, transferred to OR gates 73a . . . 73x (FIG. 3A) through enabled AND gates 213a . . . 213x. The latter gates are partially enabled by reason of logic one from an AND gate 215, (FIG. 3A), such logic one resulting from the then existing states of flipflop 177 and flipflop 181. As may be seen, AND gate 215 is enabled only when a logic one is in stage 4, 5 or 6 of recirculating register 185 and a retry is in process. At the end of the transmit gate, flipflop 187 is reset by reason of the next occurring clock pulse, c.p.(a), passing through an AND gate 219 enabled for sufficient time through a time delay 221. The same clock pulse, c.p.(a), causes (through OR gate 183) the logic one in stage 4 of recirculating register 185 to be shifted to stage 5 and the retry register 211 to be cleared through OR gate 216.

The next occurring transmit gate then fully enables either of two AND gates (AND gate 223 or AND gate 225) connected also to the output terminals of flipflop 201. If that flipflop is set, AND gate 223 is so enabled thereby causing AND gates 227a . . . 227x to be enabled and a logic one to be applied to OR gate 108. The contents of register 89 are therefore shifted to the retry register 211 and to register 103. If flipflop 201 is reset, AND gate 225 is fully enabled, without effect on the contents of the retry register 211 and without shifting the contents of register 89 to register 103. At the end of the transmit gate, whether or not flipflop 201 was set, the logic one in stage 5 of the recirculating register 185 is shifted to stage 6, a reset signal is applied to flipflop 201 and a clear signal is applied to retry register 211. This action occurs by reason of operation of a time delay 229, an OR gate 231 and an AND gate 232.

With a logic one in stage 6 of the recirculating register 185, either AND gate 233 or AND gate 235 is fully enabled during the next transmit gate. It may be seen that, if AND gate 233 is fully enabled because flipflop 203 is set, AND gates 237a . . . 237x are enabled and a logic one is applied to OR gate 92. If flipflop 203 is not set, such gates are not enabled and a logic zero is applied to OR gate 92. That is, if the block of information in register 75 (FIG. 3C) was incorrectly received when first transmitted, it is retried, otherwise not. At the end of this transmit gate, flipflop 181 (FIG. 3A) is reset(by operation of OR gate 238, time delay 240 and AND gate 242) and retry register 211 is cleared, but no shift signal is applied to recirculating register 185 through OR gate 183. With flipflop 181 reset, the transmit controller is now in condition to continue normal operation. That is, the next occurring transmit gate is effective to start the transfer of blocks of information through the registers 75, 89, 103, 141, 143, 145, 147 in the manner described hereinbefore.

Figure 4:
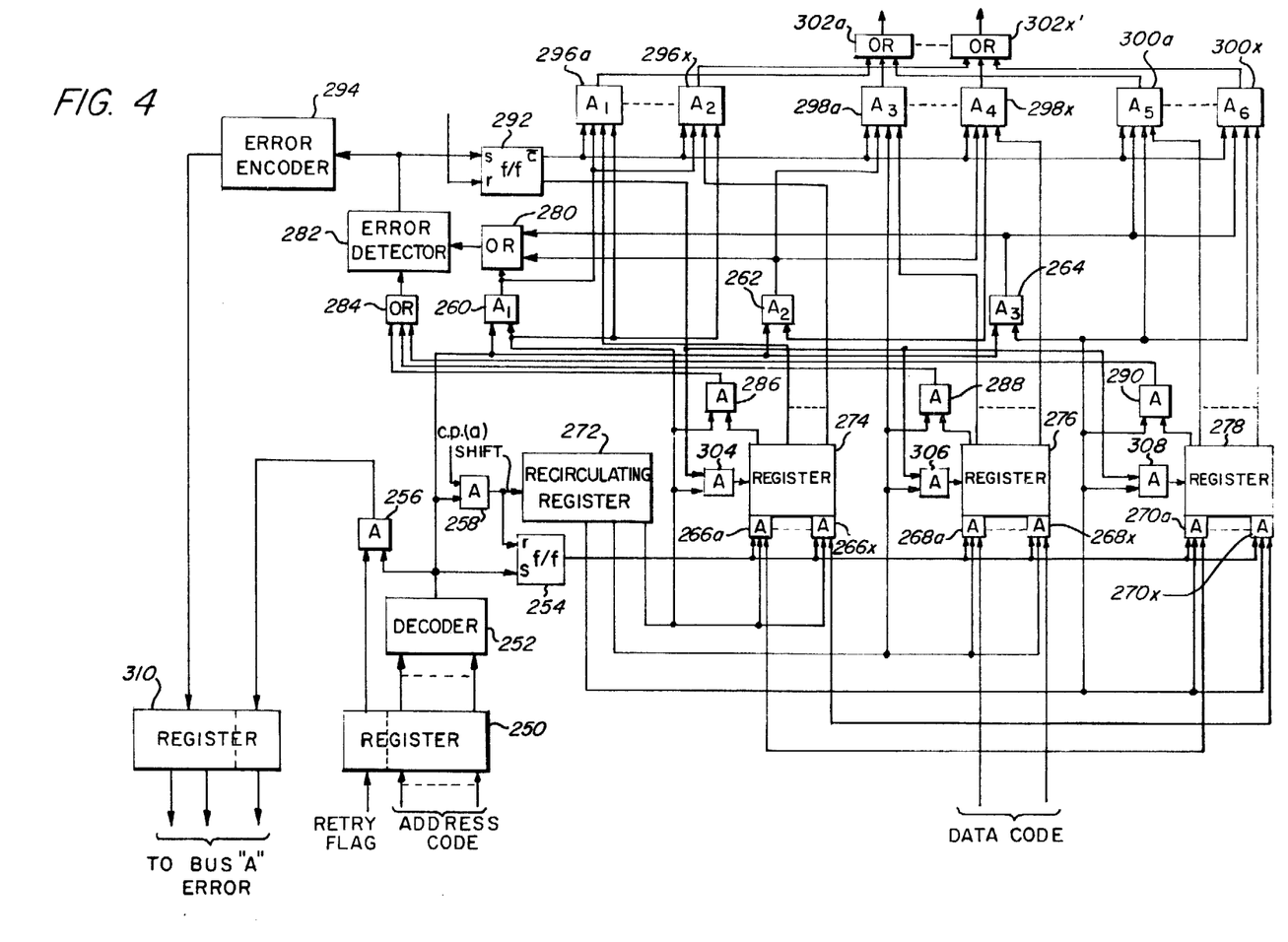
FIG. 4 is a block diagram of an exemplary receive controller to receive information transmitted over a common bus and to produce an acknowledgment signal.

Referring now to FIG. 4, an exemplary arrangement for a receive controller may be seen to include means: For accepting and storing a plurality (here three) of blocks of information; for determining whether or not each received block of information has been correctly received; and then, either for transferring a correctly received block of information to the associated major component or for inhibiting such transfer transmitting an error signal back to the originating major component. For convenience, only the receive controller associated with one bus, say bus A, is shown because the second receive controller is similar. Thus, each block of information transmitted over the bus, whether or not addressed to the major component associated with the illustrated receive controller, is impressed on input terminals (not numbered). It will be recognized that an address code is included in each block of information and that such code is impressed on a register 250. The received address then in the register 250 is applied to a conventional address decoder 252 to produce a logic one if the block of information is to be processed by the receive controller. Such logic one causes a flipflop 254 to be set and AND gates 256, 258 to be enabled along with AND gates 260, 262, 264. With the flipflop 254 set, AND gates 266a . . . 266x, AND gates 268a . . . 268x and AND gates 270a . . . 270x are partially enabled. The just-mentioned gates are successively fully enabled as a logic one is shifted through a recirculating register 272 by each clock pulse c.p.(a) passing through the AND gate 258. Each such clock pulse also causes flipflop 254 to be reset. In consequence, then, the data code (including a parity bit) for a block of information is impressed on one of three registers 274, 276, 278, depending upon the position of the logic one in the recirculating register 272. AND gates 260, 262, 264 are correspondingly enabled. The outputs of AND gates 260, 262, 264 are passed through an OR gate 280 to enable an error detector 282 to which is also applied, through an OR gate 284, an "error or no error" signal, here simply a parity bit from the selected one of the registers 274, 276, 278. To select the parity bit from the proper register, AND gates 286, 288, 290 are enabled as shown. It is noted here that if the error detector 282 is to be responsive to a single parity bit it may simply be an AND gate receiving the outputs of OR gates 280, 284 (to produce a logic one if parity exists) and an inverter (to produce a logic one if no parity exists). A logic one out of the error detector sets a flipflop 292 and actuates an error encoder 294. When the flipflop is set, AND gates 296a . . . 296x, AND gates 298a . . . 298x and AND gates 300a . . . 300x are inhibited, regardless of any other inputs thereto. That is, if no parity exists, no data code may be passed through OR gates 302a . . . 302x to the associated major component. At the same time a logic one is impressed on AND gates 304, 306, 308, thereby impressing a "clear" signal on the one of the registers 274, 276, 278 without parity. The output of the error encoder 294 is applied to a register 310 along with the logic zero (representing an original transmission) or a logic zero (representing a retry) from AND gate 256.

Having described a preferred embodiment of our contemplated control circuitry, it will now be clear to one of skill in the art that many changes may be made without departing from our inventive concepts. For example, it will be clear that the storage registers shown in out transmit and receive controllers may be replaced by queues. Further, the logic of out control arrangement could be changed without departing from our inventive concepts. For example, because there is no absolute requirement that acknowledgment signals be returned during the second time slot after transmission of a block of information, the transmit and receive controllers could be modified so as to have such acknowledgment signals returned during some other time slot. In addition, the format of the acknowledge signals could be changed from the simple one bit signal used to explain our concepts to multibit signals to permit different causes for failure of proper transmission to be communicated. Still further, as alluded to briefly in the specification, the acknowledgment signals may be used to initiate diagnostic or corrective actions. That is, the acknowledgment signals could be used to switch standby major components into a digital computer system whenever it is determined that an operating major component has failed. Still further, it is within our inventive concepts that the disclosed bus control arrangement may even be used to interconnect independent digital computers through appropriate interfaces.

In view of the foregoing it is felt therefore that this invention should not be restricted to its disclosed embodiment but rather should be limited only by the spirit and scope of the appended claims.

What is claimed is:

1. In a digital computer system wherein a plurality of components is interconnected through a common bus, the operation of each one of such components being synchronized by clock pulses from a system clock pulse generator to produce, during the execution of a program and in intervals between clock pulses, a block of information to be transmitted over the bus, the improvement comprising:
 a. selector means, associated with each one of the plurality of components, for producing, during any given interval between successive clock pulses, a transmit gating signal for its associated component to enable transmission of a block of information only from that single one of the components;
 b. transmitting control and storage means having an independent controller portion and a storage portion associated with each different one of the plurality of components, each one of such portions being responsive to a transmit gating signal simultaneously to couple information from the corresponding one of the components to the bus and also to store such information within such storage portion;
 c. receiving means, associated with each one of the plurality of components and the bus, for accepting and storing information transmitted on the bus en route to and addressed to an associated component;
 d. means associated with each of the plurality of components for checking parity of information addressed to the associated component and for producing, when parity is not correctly obtained, an error signal transmitted back to the transmitting components control and storage means; and,
 e. means, responsive to the error signal, for inhibiting transmission of further information directly from the corresponding one of the components and for retransmitting the information stored in the transmitting components control and storage means during the next occurring transmit gating signal.

2. The improvement as in claim 1 wherein the last-named means includes, additionally, means for transmitting, along with the stored information, a retry signal indicating that stored information is being retransmitted.

3. The improvement as in claim 2 wherein the receiving means is responsive to the retry signal to cease generation of an error signal.

4. In a digital computer system wherein pairs of components in a plurality of components are operatively interconnected through at least a pair of common buses, the operation of each one of such components being synchronized by clock pulses from a clock pulse generator so that, at any given interval between successive clock pulses, any or all of the components may produce information to be transmitted over one of the common buses, the improvement comprising:
 a. a like plurality of bus selector assemblies, each one thereof being connected to one of the plurality of components, each one of such bus selector assemblies including
  i. a number, corresponding to the number of buses interconnecting said components, of bus selectors, corresponding ones of such bus selectors in each one of the bus selector assemblies being serially connected to form a different closed loop of bus selectors each selector corresponding to one of the buses, the bus selectors, in each different closed loop being normally responsive to a signal representative of the condition, at each clock pulse, of the preceding bus selector and to control signals from an associated component to permit, in any one closed loop, only a single one of the bus selectors to produce a transmit gating signal during any interval between successive clock pulses, and ii. interlocking means, disposed between the bus selectors in each one of the bus selector assemblies, for inhibiting, during the interval between any two successive clock pulses, more than one bus selector in the same assembly thereof from producing a transmit gating signal; and b. a transmit gate disposed between each bus selector and its corresponding bus, each one of such transmit gates being responsive to a transmit gating signal and to a block of information from the associated component, for impressing such block of information on a selected one of the buses.

5. The improvement as in claim 4 having additionally: means, responsive to a first and a second control signal from selected ones of the components, for inhibiting operation of the interlocking means and of selected ones of the bus selectors in the selector assembly of the selected ones of the components.

* * * * *